United States Patent [19]
White

[11] Patent Number: 5,898,911
[45] Date of Patent: Apr. 27, 1999

[54] CURRENT-STACKED DX SWITCH WITH HIGH RF ISOLATION

[75] Inventor: Peter White, Encinitas, Calif.

[73] Assignee: Hughes Electronics Corporation, El Segundo, Calif.

[21] Appl. No.: 08/820,597

[22] Filed: Mar. 19, 1997

[51] Int. Cl.[6] ................................................ H04B 1/06
[52] U.S. Cl. .................................. 455/232.1; 455/249.1
[58] Field of Search .......................... 455/249.1, 232.1, 455/234.1, 234.2, 572, 254, 574, 343, 127; 330/284; 333/103, 104, 262; 327/308, 320, 325, 482

[56] References Cited

U.S. PATENT DOCUMENTS

| | | |
|---|---|---|
| 4,236,126 | 11/1980 | Weller et al. ............................ 327/308 |
| 4,646,036 | 2/1987 | Brown ...................................... 327/308 |
| 4,817,198 | 3/1989 | Rinderle ................................ 455/249.1 |
| 5,280,643 | 1/1994 | Ishii ....................................... 455/249.1 |
| 5,638,141 | 6/1997 | Bae et al. ............................... 455/249.1 |

*Primary Examiner*—Reinhard J. Eisenzopf
*Assistant Examiner*—Greta Fuller
*Attorney, Agent, or Firm*—John T. Whelan; Michael W. Sales

[57] ABSTRACT

An rf receiver front end that includes a switchable attenuation circuit or DX switch and uses a power saving technique. The switchable attenuation circuit is dc connected in series with one or more rf circuits so that power drawn from a constant voltage power supply is reduced. The rf circuit may include an rf mixer, a low-noise amplifier, or both.

12 Claims, 4 Drawing Sheets

CURRENT-STACKED DX SWITCH WITH HIGH RF ISOLATION

BACKGROUND OF THE INVENTION

This invention relates to RF circuitry, and more particularly, to a radio receiver front-end circuit that utilizes a power saving technique.

Existing pagers and portable cellular products use current stacking of circuit elements to reduce power consumption from a fixed-voltage power source. However, incorporating a local/distant (DX) switch in a circuit using current stacking is not known.

SUMMARY OF THE INVENTION

The present invention is embodied in a current stacked switching circuit that provides substantial rf isolation in its "on" state with respect to its "off" state. The current-stacked switching circuit provides more efficient use of power supply voltage, which is advantageous in portable unit design.

More specifically, the apparatus includes a fixed voltage power supply, an rf or "DX" switch, and an active rf circuit. The rf switch includes an rf input port and an rf output port and has a high-impedance state and a low-impedance state for selectively attenuating the rf signal between rf input port and the rf output port. The impedance state is selected by a DX select signal. The rf circuit has active elements for operating on the rf signal that is selectively attenuated by the rf switch. Further, the rf switch is dc connected in series with the rf circuit such that dc current from the power supply that flows through the rf switch also flows through the rf circuit.

In a more detailed feature of the present invention, the rf switch further includes first and second selectable rf signal paths between the rf input port and the rf output port. The first rf path includes a first PIN diode and has a relatively low rf impedance so that rf signals coupled through the first rf path undergo relatively little attenuation. The second rf path has two parallel branches, each parallel branch including a PIN diode connected in series with a resistor. The second rf path has a relatively high rf impedance so that rf signals coupled through the second rf path are highly attenuated by a predetermined amount. The rf switch also includes select switches that select, based on the select signal, either the first rf path or the second rf path. A low select signal results in the select switches selecting the first rf path and thus causing the rf switch to have a relatively low rf impedance, and a high select signal results in the select switches selecting the second rf path and thus causing the rf switch to have a relatively high rf impedance. The rf circuit may comprise an active rf mixer, a low-noise amplifier, or both. For example, the rf circuit may include a mixer that is rf coupled to the rf output port and that is dc connected in series between the dc power supply and the rf switch, and the rf circuit may further include a low-noise amplifier that is rf coupled to the rf input port and that is dc connected in series between the rf switch and a dc ground of the dc power supply.

In another feature of the present invention, the rf switch has a first dc current path, between the rf input port and the rf output port, that includes a first PIN diode connected between the rf input port and the rf output port. The rf switch also has a second dc current path, between the rf input port and an rf ground terminal, that includes a second PIN diode and a third PIN diode. The second PIN diode is rf coupled between the rf input port and the rf ground terminal and is dc coupled in parallel with the third PIN diode. The third PIN diode is rf coupled between the rf output port and on rf ground terminal. The rf switch also has first and second transistor switches. The first transistor switch selects the first dc current path when the select signal is in a first state and the second transistor selects the second dc current path when the select signal is in a second state. The select signal causes the transistor switches to select either the first dc current path or the second dc current path and the rf impedance between the input port and the output port is relatively low when the select signal selects the first dc current path and is relatively high when the select signal selects the second dc current path.

In yet another more detailed feature of the present invention, the rf switch includes a first rf coupling capacitor for coupling the second PIN diode to an rf ground terminal at a first location and a second rf coupling capacitor for coupling the third PIN diode to the rf ground terminal at a second location spaced away from the first location. The rf switch may further include a resistor coupled between the rf input port and the rf output port through a coupling capacitor, and an inductor coupled between the rf input port and the rf output port through the coupling capacitor. Further, the inductor is sized to resonate with first PIN diode's off capacitance within the frequency band of the rf signals. The first switch may also include a PNP transistor that is dc coupled in series with the first dc current path, and the second switch may include an NPN transistor that is dc coupled in series with the second dc current path.

BRIEF DESCRIPTION OF THE DRAWINGS

The above and other aspects, features and advantages of the present invention will be more apparent from the following more particular description thereof, presented in conjunction with the following drawings, wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with the reference to the claims.

Figure 1:
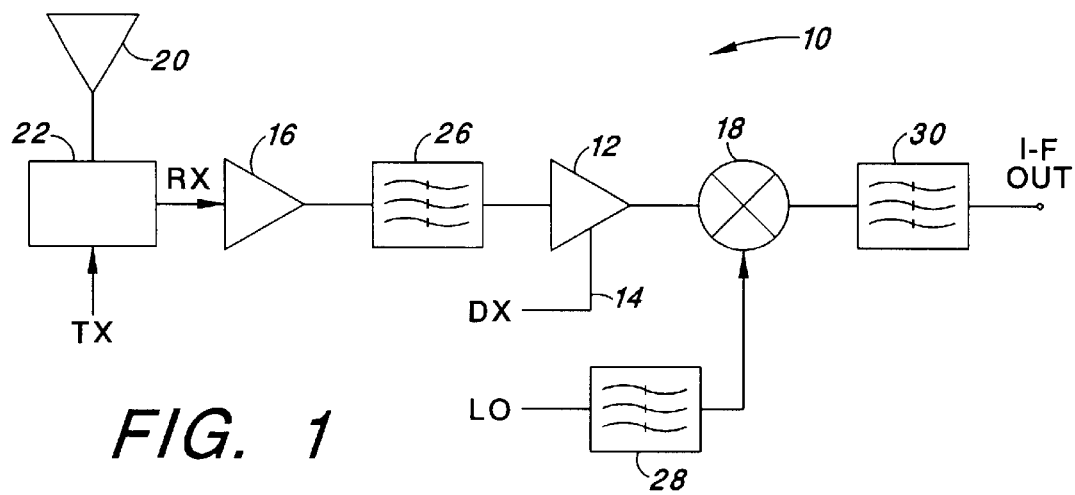
FIG. 1 is a block diagram of an rf receiver having an rf switch current stacked with an rf circuit, in accordance with the present invention.

As shown in the exemplary drawings, and particularly in FIG. 1, the present invention in embodied in an rf receiver 10 that provides switched attenuation levels in a power efficient configuration. The switched attenuation levels are provided by a local/distance (DX) switch 12 controlled by an on/off DX line 14. The power efficient configuration is provided by connecting the DX switch in series with other rf components, such as a low-noise amplifier (LNA) 16, a mixer 18, or both. The rf circuit has a unique "current stacked" configuration in which the paths of the rf signals and the dc current overlap, yet operate relatively independently. The rf signal path is from an antenna 20, through a duplex filter 22, the low-noise amplifier 16, an RX filter 26, the DX switch 12, and finally, through the mixer 18.

As mentioned before, the rf receiver 10 utilizes a power conservation technique called "current stacking." The circuit's principle dc current path (FIG. 3) is from a 5 volt power supply RX5V, through the mixer 18, the DX switch 12, and finally, through the LNA 16 to a dc circuit ground 24. The current stacked configuration of the rf circuit of the receiver front end design consists of a mixer, LNA, and DX switch. Several filters 26, 28 and 30 provide rf band selectivity. The only connections to the power supply RX5V are at the mixer transistors' collectors and at the mixer transistors' base-bias voltage divider.

Figure 2A:
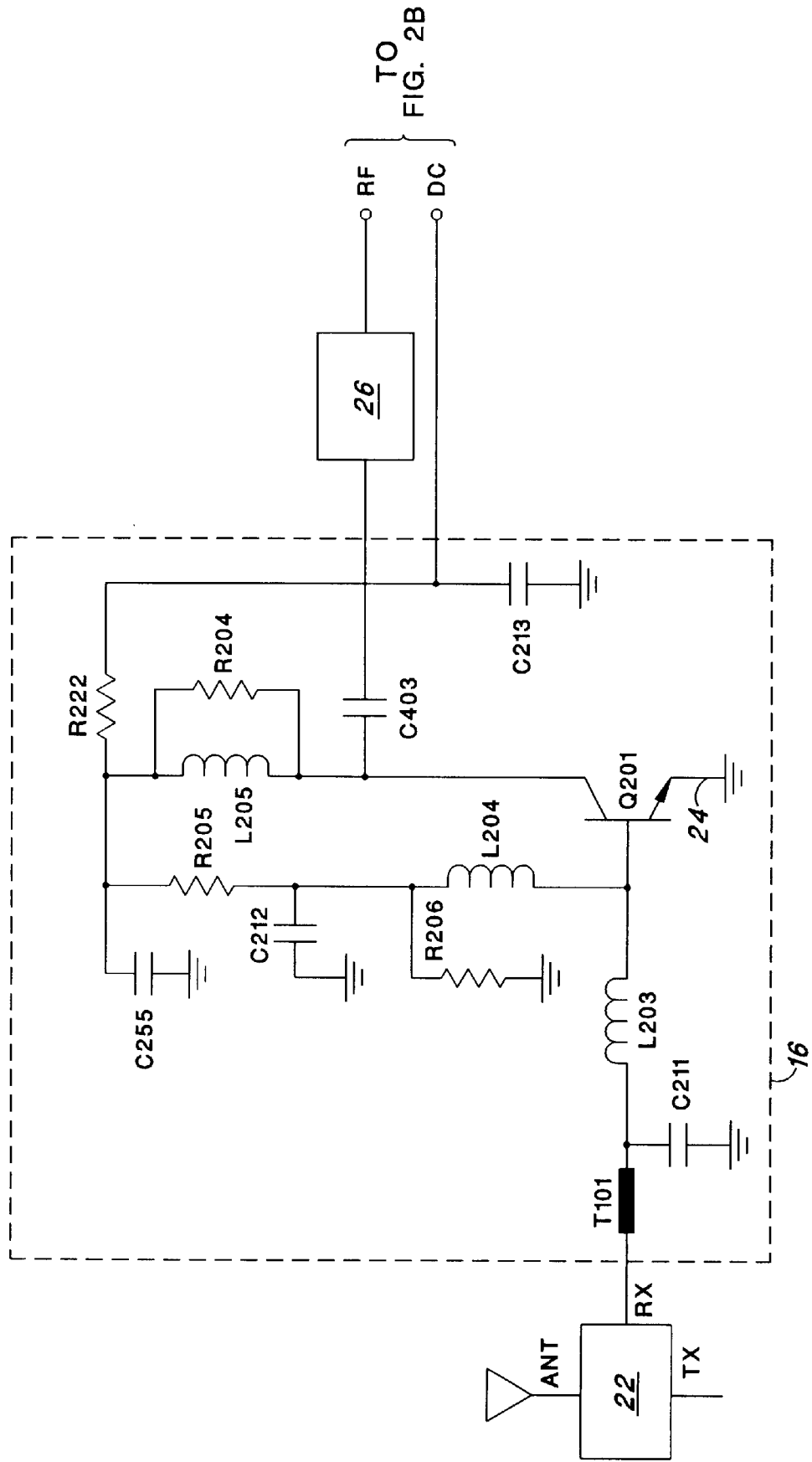
FIGS. 2A and 2B is a split schematic circuit diagram of the rf receiver of FIG. 1.
Figure 2B:
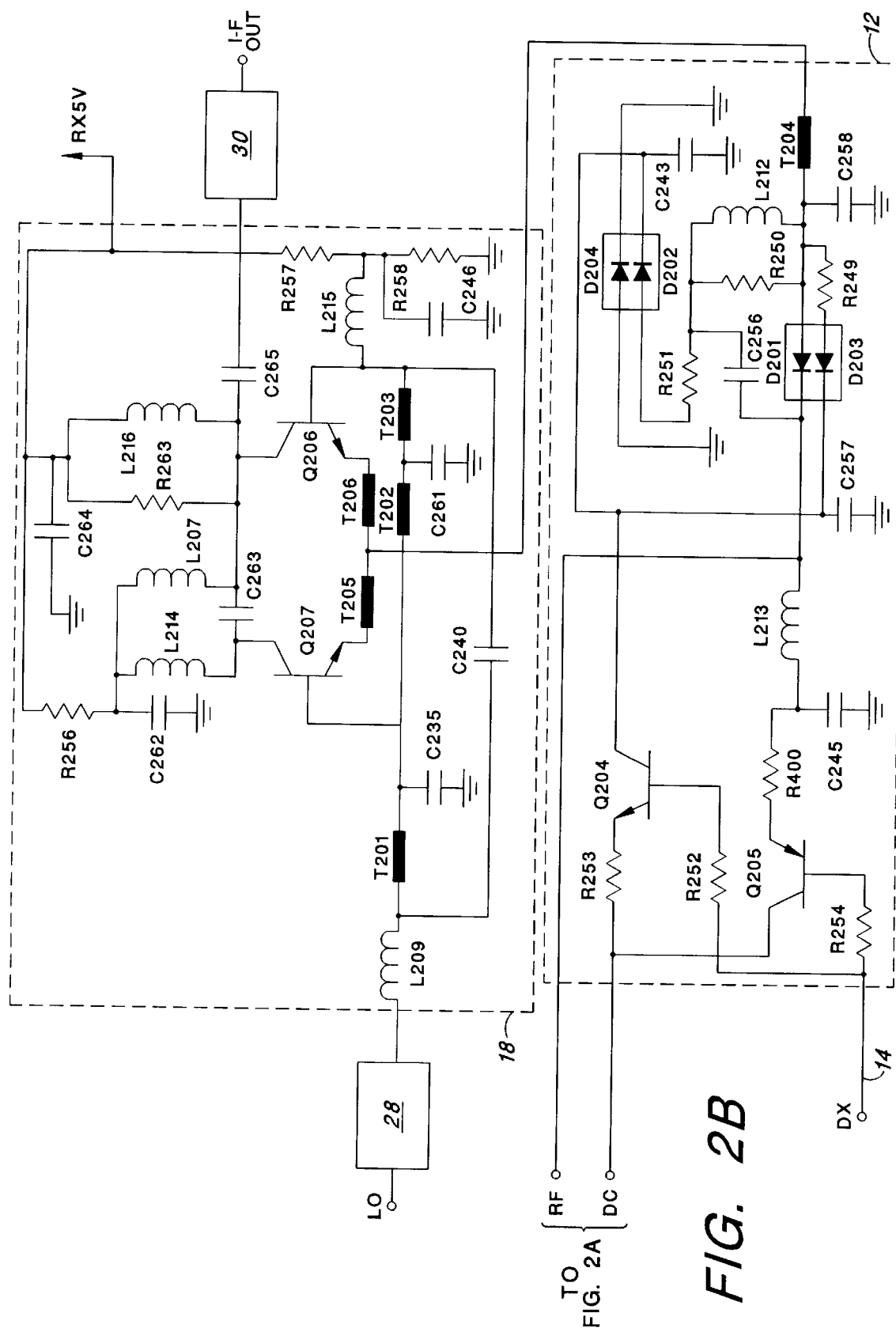

With particular reference to FIGS. 2A and 2B, rf signals enter the rf circuit 10 through an antenna port ANT of a duplex filter 22. The duplex filter provides some initial receive (RX) band selectivity (869 to 894 MHZ). The RX rf signals exit the duplex filter and enter the LNA 16 through a transmission line T101 and an inductor L203. The LNA is constructed of a low-noise transistor Q201 and associated components. The LNA amplifies the rf signal without excessively adding noise to the signal. A band-pass filter (RX filter 26) provides further selectivity of the RX band and prevents rf signals, at frequencies outside of the RX band, from propagating in a reverse direction through the LNA and duplex filter, and radiating out of the antenna.

The RX rf signals from the LNA 16 then pass through the DX switch 12. The DX switch provides a selectable attenuation for adjusting the power level of the rf signal before it is applied to the mixer 18. The attenuation is controlled by a digital signal on the DX line 14. A logic LOW signal on the DX line causes the DX switch to pass the rf signal with relatively low insertion loss (about 3 to 4 db). A logic HIGH signal on the DX line causes the DX switch to attenuate the rf signal to about 26 db below the low insertion loss level. The circuit for the DX switch is based on a switchable pad comprised of PIN diodes D201, D202 and D203, current switching transistors Q204 and Q205, and other associated discrete components. The DX switch will be discussed in more detail below.

The mixer 18 receives the rf signals at the emitters of two transistors Q206 and Q207, from the DX switch 12 through the transmission lines T204, T205 and T206. The active mixer has balanced local oscillator (LO) drive at the transistors' bases and an intermediate-frequency (i-f) phase shifter/combiner at the transistors' output collectors. The balanced LO configuration provides cancellation of the LO's RX band noise when used in conjunction with the i-f phase shifter/combiner. The LO signal enters a LO phase shifter that produces balanced LO drive for the mixer. The phase shifter uses a foreshortened "rat race" structure that is realized with transmission lines T201, T202 and T203 and capacitors C235, C261 and C240. The mixer down converts the signal to the first RX i-f frequency (85 MHZ) which is selected by a SAW filter 30.

Figure 3:
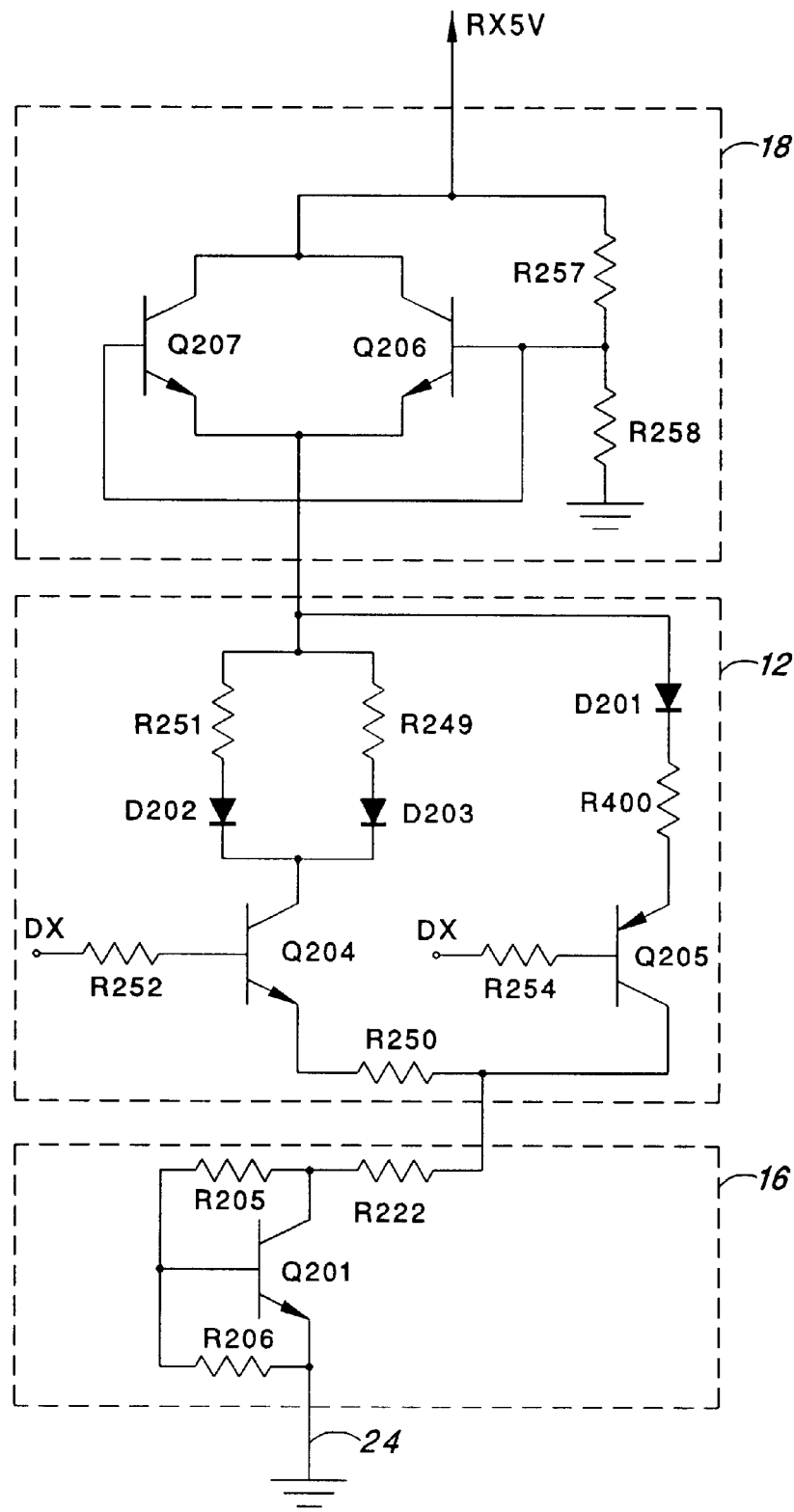
FIG. 3 is a schematic diagram showing the current stacked dc current path of the rf receiver of FIG. 1, in accordance with the present invention.

The dc current path is shown in FIGS. 2A, 2B and 3. Current from the power supply RX5V flows through the mixer 18 through the DX switch 12 (either the series path or the shunt paths depending on the state of the DX input), through the DX switch driver transistors, Q204 and Q205, and finally through the LNA 16 to circuit ground locations at the emitter of the LNA transistor Q201 and at the bias resistor R206. This technique reuses the current of each stage, but limits the maximum voltage drop across each stage. The stacked current design allows for more efficient utilization of power from the fixed-voltage supply power.

More specifically, the mixer 18 is at the top of the current stack with the two collectors of the transistors Q206 and Q207 dc connected to the power supply RX5V. The base bias current for the transistors is supplied by a voltage divider formed by resistors R257 and R258. The combined current through the transistors' emitters transistors supply current to the DX switch 12. The current flows through one of the two DX switch current paths, depending on the state of the DX switch. In the "DX off" state, dc current passes through the series PIN diode D201 and in the "DX on" state, dc current passes through the two shunt resistors R249 and R251 and shunt PIN diodes D202 and D203. The respective current path is selected by the state of the DX control line 14 which activates one of the two series transistors Q204 and Q205 to a conductive state. Two resistors R253 and R400 in the dc current paths of the transistors Q204 and Q205, respectively, are used to maintain a constant voltage drop across the DX switch whether it is in the "DX on" or "DX off" state. DC current from the DX switch is then supplied to the collector of the LNA transistor Q201 and returned to dc current ground 24 at the LNA transistor's emitter.

Figure 4:
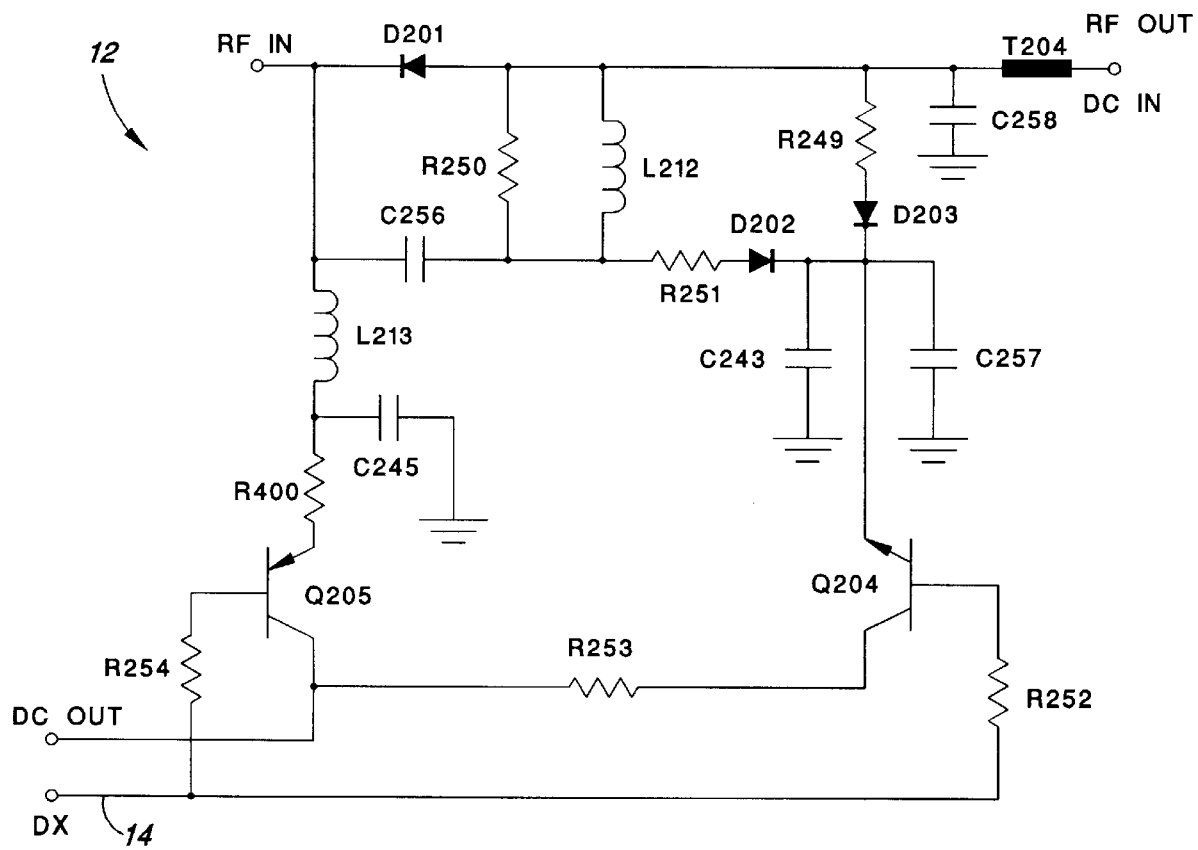
FIG. 4 is a schematic circuit diagram of an rf of "DX" switch of the rf receiver of FIG. 1.

The topology of the DX switch 12, shown in FIG. 4, is based on a switchable PI pad configuration. In the "DX off" state (low impedance), the PNP transistor Q205 is turned on and the NPN transistor Q204 is turned off so that the series branch of the pad is shorted by forward biasing the PIN diode D201 by the current passing through the PNP transistor Q205. (An rf choke formed by inductor L213, is used to pass a dc bias current from PIN diode D201 to the bias switching transistor Q205.) The characteristic of a PIN diode is that it has a relatively high ac resistance or rf impedance value it is when reverse biased, and that it has a relatively low rf impedance when it is forward biased, because a PIN diode's rf impedance decreases with increasing forward current. Thus, the rf impedance through the DX switch is relatively low (about 1.3 db). The shunt branches are open circuited by not biasing the PIN diodes D202 and D203.

In the "DX on" state (high impedance), the NPN transistor Q204 is turned on and the PNP transistor Q205 is turned off. Accordingly, the dc current from the mixer flows through the NPN transistor Q204 and is split along the parallel dc current paths through the PIN diodes D202 and D203 and series resistors, R251 and R249, respectively. In the "DX on" state, high isolation is achieved by two methods. First, by resonating the "off" capacitance of the series path PIN diode D201 with the inductor L212. Second, by minimizing signal leakage through the shunt branches of the PI pad using two PIN diodes D202 and D203. Using just one PIN single diode to short the shunt legs would result in an rf path from the pad's input to its output through the shunt resistors R249 and R251. The resulting impedance or isolation level would be proportional to the "on resistance" of the one PIN diode and the impedance of the bypass capacitor shorting it to ground. Note that, in the design of the present invention, the two bypass capacitors, C257 and C243, are connected at two physically separated ground points, which is advantageous for achieving high isolation. The "DX on" attenuation is set by the resistor R250 of the PI pad, and is limited by the Q of the parallel RLC resonant circuit formed by the PIN diode D201 (its off capacitance), the resistor R250, and the inductor L212. The "DX off" insertion loss is limited mainly by the "on" impedance of the PIN diode D201, which in other circuits, will introduce dissipative loss and mismatch due to the diode's non-ideal "on inductance."

The DX switch 12 has a characteristic impedance that is well matched to a 50 ohm load in both the "DX on" and the "DX off" states, without using relatively long quarter-wave transmission lines or generally more expensive low "on resistance" PIN diodes. The remaining inductors and the capacitors in the DX switch circuit 12, not mentioned above, provide the appropriate RF shields and grounds.

Other high attenuation PIN switch designs can be matched to a 50 ohm load, but then they are not well matched for other loads. Also, the attenuation of other anttenuator designs typically depend upon an analog control voltage and have a non-constant dc current. A non-constant dc current is generally inconsistent with a stacked current design.

Describing the schematic shown in FIGS. 2A and 2B, the duplex filter 22 has an antenna connected to the a filter's input/output port ANT, a transmitter circuit connected to the filter's input port TX, and the rf circuit 10 connected to the filter's output port RX. The output port RX is coupled through a transmission line T101 and an inductor L203 to the base of a transistor Q201. A capacitor C211 couples the node between the transmission line T101 and the inductor L203 to an rf ground terminal. The emitter of the transistor Q201 is connected to an rf ground terminal. Also connected to the base of transistor Q201 is an inductor L204 connected in series with a resistor R205. A parallel combination of a capacitor C212 and a resistor R206 is connected between an rf ground terminal and the node between inductor L204 and resistor R205. The resistor R205 is coupled through resistor R222 to a current source DC from the DX switch 12. A capacitor C213 is connected between the current source DC and an rf ground terminal. An inductor L205 is connected between the node between the resistors R205 and R222 and the emitter of the transistor Q201. A resistor R204 is connected in parallel with the inductor L205. A capacitor C403 rf couples the emitter of the transistor Q201 to an rf input port of the receive filter 26.

The rf output port of the receive filter 26 is connected to the cathode of PIN diode D201. The anode of PIN diode D201 is connected to transmission line T204 and is coupled to a ground terminal by capacitor C258. The current source DC from the DX switch 12 originates at the collector of a PNP transistor Q205 and at the emitter, coupled through a resistor R253, of an NPN transistor Q204. The bases of the transistors Q204 and Q205 are coupled to the DX line 14 through the resistors R252 and R254, respectively. The emitter of the transistor Q205 is coupled to the cathode of PIN diode D201 through a resistor R400 connected in series with an inductor L213. A capacitor C245 is connected between an rf ground terminal and a node between the resistor R400 and the inductor L213. The collector of the NPN transistor Q204 is connected to the cathodes, respectively, of PIN diodes D202 and D203. The cathode of PIN diode D202 is rf coupled to a ground terminal by a capacitor C243 and the cathode of the PIN diode D203 is rf coupled to a ground terminal by a capacitor C257. The anode of the PIN diode D203 is coupled to the anode of the PIN diode D201 by a resistor R249. The anode of the PIN diode D201 is also coupled to a ground terminal by a capacitor C258. The anode of the PIN diode D202 is coupled to the cathode of the PIN diode D201 by the series connection of a resistor R251 and a capacitor C256. The node between the resistor R251 and the capacitor C256 is coupled to the anode of PIN diode D201 by a resistor R250. An inductor L212 is connected in series with the resistor R250.

The transmission line T204 couples the anode of the diode D201 to the emitters of two transistors Q206 and Q207 through transmission lines T206 and T205, respectively. A local oscillator LO is coupled to the base of the transistor Q207 through a series connection of a filter 28, an inductor L209 and a transmission line T201. The base of the transistor Q207 is also coupled to a ground terminal by a capacitor C235. The base of the transistor Q206 is coupled to the node between inductor L209 and the transmission line T201 by a capacitor C240. The base of transistor Q206 is also coupled to the base of the transistor Q207 by a series connection of two transmission lines T202 and T203. The node between the transmission lines T202 and T203 is coupled to a ground terminal by a capacitor C261. The base of the transistor Q206 is dc connected to a power supply RX5V by a series connection of an inductor L215 and a resistor R257. The node between the inductor L215 and the resistor R257 is coupled to a ground terminal by a parallel combination of a resistor R258 and a capacitor C246. The collector of the transistor Q207 is coupled to the power supply RX5V by through a series connection of an inductor L214 and a resistor R256. The node between the inductor L214 and the resistor R256 is coupled to a ground terminal through a capacitor C262. That node is also coupled to the collector of transistor Q206 through an inductor L207. The collectors of transistors Q206 and Q207 are coupled together by a capacitor C263. The collector of the transistor Q206 is dc connected to the power supply RX5V through a parallel combination of an inductor L216 and a resistor R263. The power supply RX5V is coupled to a ground terminal by a capacitor C263. The collector of the transistor Q206 is rf coupled to an input port of an IF filter 30 through a capacitor C265.

In a preferred embodiment, the receiver's components have approximately the following values:

| Component | Value | Component | Value |
|---|---|---|---|
| R204 | 200Ω | R205 | 4.7K |
| R206 | 3.9K | R222 | 180Ω |
| R249 | 68Ω | R250 | 820Ω |
| R251 | 68Ω | R252 | 30K |
| R253 | 30K | R254 | 15K |
| R256 | 1K | R257 | 9.1K |
| R258 | 78.7K | R263 | 2.2K |
| R400 | 56Ω | L203 | 4.7 nH |
| L204 | 100 nH | L205 | 6.8 nH |
| L207 | 680 nH | L209 | 15 nH |
| L212 | 82 nH | L213 | 82 nH |
| L214 | 680 nH | L215 | 100 nH |
| L216 | 680 nH | C211 | 5.6 pF |
| C212 | 0.033 µF | C213 | 0.033 µF |
| C235 | 3.3 pF | C240 | 1.5 pF |
| C245 | 0.033 µF | C246 | 0.033 µF |
| C255 | 33 pF | C256 | 33 pF |
| C257 | 0.33 µF | C258 | 3.3 pF |
| C261 | 3.3 pF | C262 | 3.3 pF |
| C263 | 1.0 pF | C264 | 0.033 µF |
| C265 | 0.033 µF | C403 | 2.7 pF |

While the invention herein disclosed has been described by means of specific embodiments and applications thereof, numerous modifications and variations could be made thereto by those skilled in the art without departing from the scope of the inventions set forth in the claims.

What is claimed is:

1. Apparatus for selectively attenuating, based on a select signal, rf signals, comprising:
   a fixed voltage dc power supply;
   an rf switch having an rf input port and an rf output port and having a high-impedance state and a low-impedance state for selectively attenuating an rf signal between the rf input port and the rf output port, wherein the switch's impedance state is selected by the select signal; and an rf circuit having active elements for operating on the rf signal that is selectively attenuated by the rf switch, wherein the rf switch is dc connected in series with the rf circuit such that dc current from the power supply that flows through the rf switch also flows through the rf circuit.

2. Apparatus for receiving rf signals as defined in claim 1, wherein the rf switch further comprises:

first and second selectable rf signal paths between the rf input port and the rf output port, the first rf path having a relatively low rf impedance so that rf signals coupled through the first rf path undergo relatively little attenuation and the second rf path having a relatively high rf impedance so that rf signals coupled through the second rf path are highly attenuated by a predetermined amount; and select switches that select, based on the select signal, either the first rf path or the second rf path, wherein a low select signal results in the select switches, selecting the first rf path and causing the rf switch to have a relatively low rf impedance and a high select signal results in the select switches selecting the second path causing the rf switch to have a relatively high rf impedance.

3. Apparatus for receiving rf signals as defined in claim 1, wherein:

the first rf path includes a first PIN diode; and the second rf path has two parallel branches, each parallel branch including a PIN diode connected in series with a resistor.

4. Apparatus for receiving rf signals as defined in claim 1, wherein the rf circuit is an active rf mixer, rf coupled to the rf output port, that down converts an rf signal's carrier frequency from an rf frequency to an intermediate frequency.

5. Apparatus for receiving rf signals as defined in claim 1, wherein the rf circuit is a low-noise amplifier rf coupled to the rf input port.

6. Apparatus for receiving rf signals as defined in claim 1, wherein the rf circuit comprises:

an rf mixer that is rf coupled to the rf output port and that is dc connected in series between a dc power supply and the rf switch; and a low-noise amplifier that is rf coupled to the rf input port and that is dc connected in series between the rf switch and a dc ground of the dc power supply.

7. Apparatus for receiving rf signals as defined in claim 1, wherein the rf switch further comprising:

a first dc current path, between the rf input port and the rf output port, that includes a first PIN diode connected between the rf input port and the rf output port;

a second dc current path, between the rf input port and an rf ground terminal, that includes second and third PIN diodes, the second PIN diode being rf coupled between the rf input port and the rf ground terminal and being dc coupled in parallel with the third PIN diode, and the third PIN diode being rf coupled between the rf output port and an rf ground terminal;

a first transistor switch, responsive to the select signal, for selecting the first dc current path when the select signal is in a first state;

a second transistor switch, responsive to the select signal, for selecting the second dc current path when the select signal is in a second state;

wherein the select signal causes the first and second transistor switches, to select only either the first dc current path or the second dc current path; and wherein the rf impedance between the input port and the output port is relatively low when the select signal selects the first dc current path and is relatively high when the select signal selects the second dc current path.

8. Apparatus for selectively attenuating rf signals between an rf input port and an rf output port, comprising:

a first dc current path, between the rf input port and the rf output port, that includes a first PIN diode connected between the rf input port and the rf output port;

a second dc current path, between the rf input port and an rf ground terminal, that includes a second PIN diode rf coupled between the rf input port and the rf ground terminal and dc coupled in parallel with a third PIN diode, the third PIN diode further being rf coupled between the rf output port and the rf ground terminal;

a first switch, responsive to a control signal, for selecting the first dc current path when the control signal is in a first state;

a second switch, responsive to the control signal, for selecting the second dc current path when the control signal is in a second state;

wherein the control signal causes the first and second switches to select either the first dc current path or the second dc current path; and wherein the rf impedance between the input port and the output port is relatively low when the control signal selects the first dc current path and is relatively high when the control signal selects the second dc current path.

9. Apparatus for selectively attenuating rf signals as defined in claim 8 further comprising:

a first rf coupling capacitor for coupling the second PIN diode to an rf ground terminal at a first location; and a second rf coupling capacitor for coupling the third PIN diode to the rf ground terminal at a second location spaced away from the first location.

10. Apparatus for selecting attenuating rf signals as defined in claim 8, further comprising:

a resistor coupled between the rf input port and the rf output port through a coupling capacitor;

an inductor coupled between the rf input port and the rf output port through the coupling capacitor;

wherein the inductor is sized to resonate with first PIN diode's off capacitance, within the frequency band of the rf signals.

11. Apparatus for selectively attenuating rf signals as defined in claim 8, wherein:

the first switch includes a PNP transistor that is dc coupled in series with the first dc current path; and the second switch includes an NPN transistor that is dc coupled in series with the second dc current path.

12. Apparatus for selectively attenuating, based on a select signal, rf signals, comprising:

means for supplying dc power at a predetermined voltage;

rf switch means for selectively attenuating an rf signal between an rf input port and an rf output port, wherein the rf switch means has a high-impedance state and a low-impedance state, and the rf switch means impedance state is selected by the select signal; and an active rf circuit means for operating on the rf signal that is selectively attenuated by the rf switch means, wherein the rf switch means is dc connected in series with the rf circuit means such that dc current from the dc power means that flows through the rf switch means also flows through the rf circuit means.

* * * * *